Feb. 5, 1952 A. WYSS 2,584,524
SINGLE MOLD MACHINE FOR THE MANUFACTURE
OF HOLLOW GLASS ARTICLES
Filed Jan. 10, 1946 7 Sheets-Sheet 2

INVENTOR:
Alphons Wyss
by Sommers & Young
Attorneys

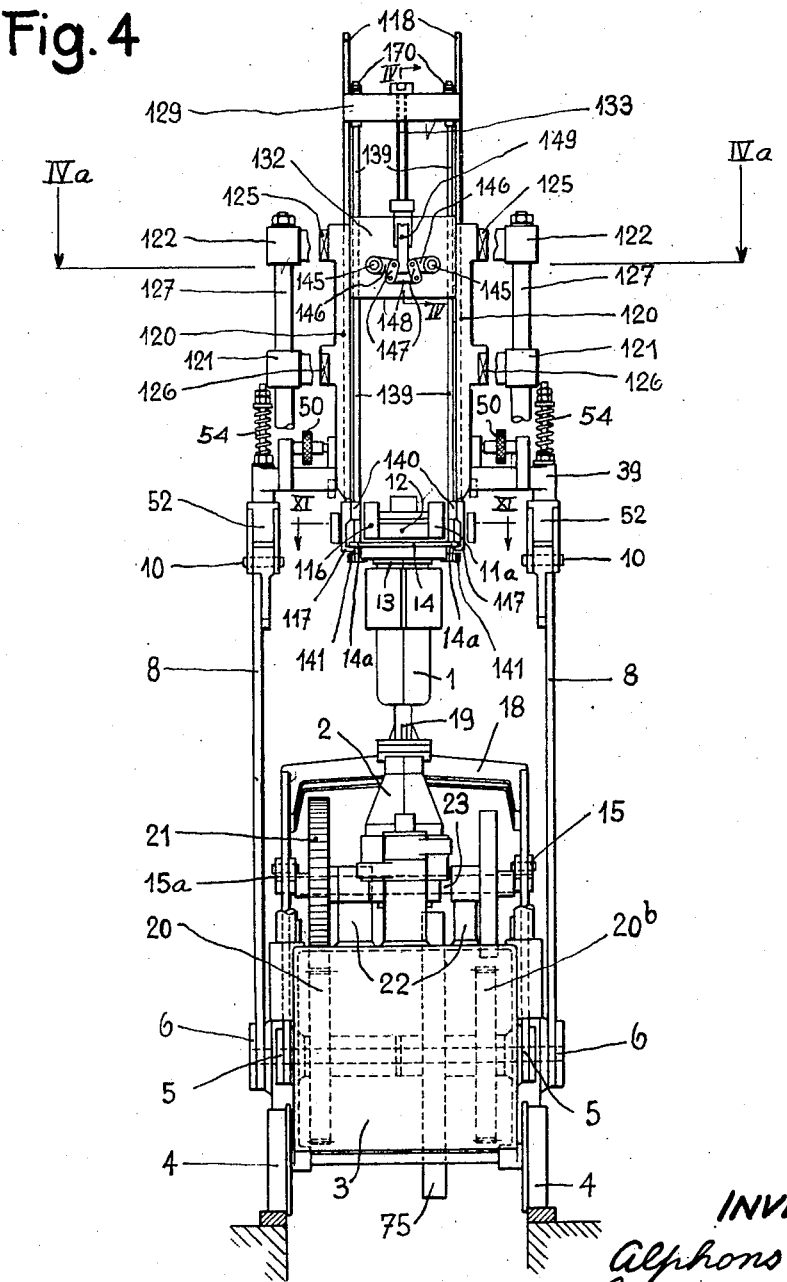

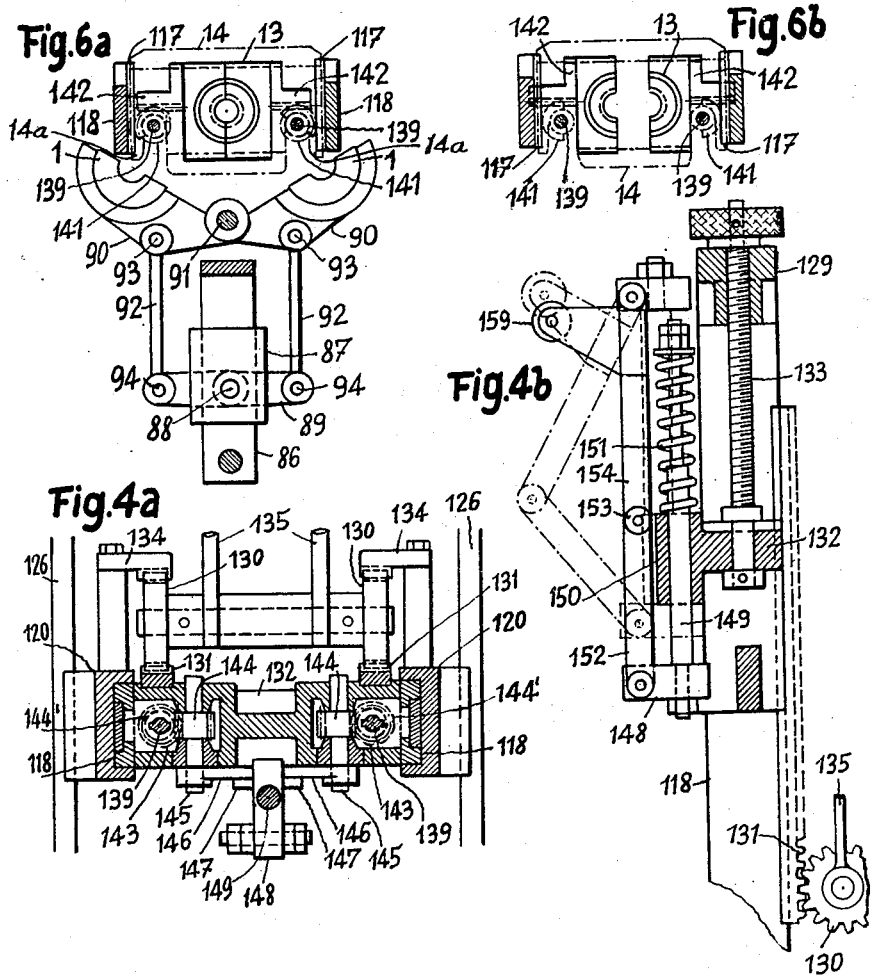

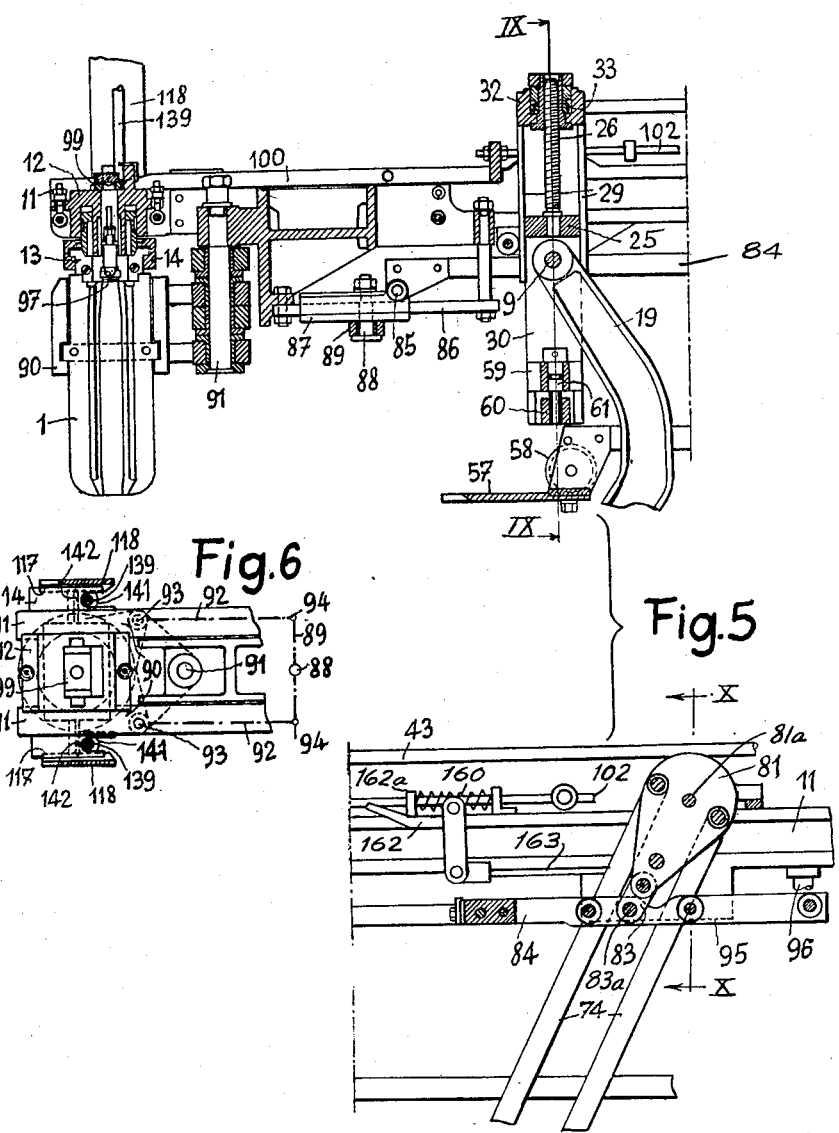

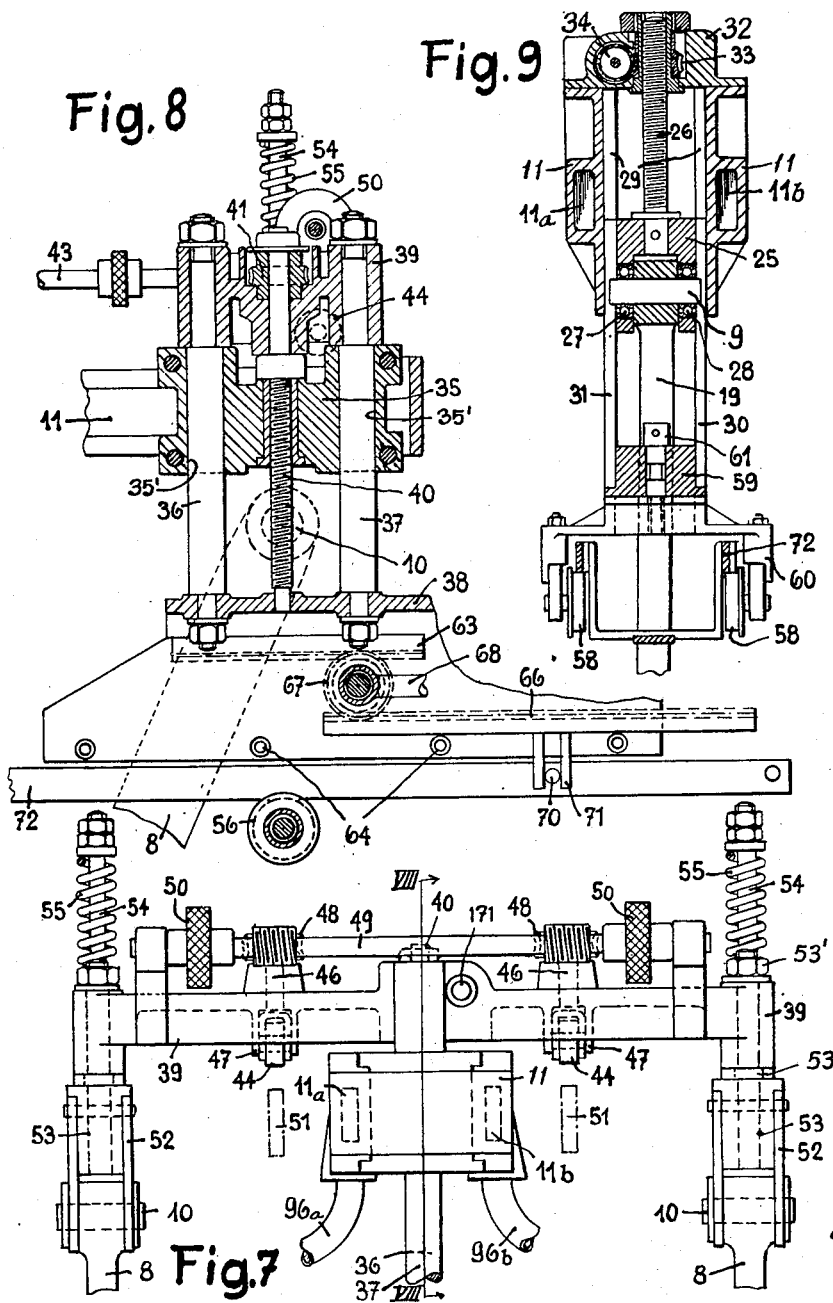

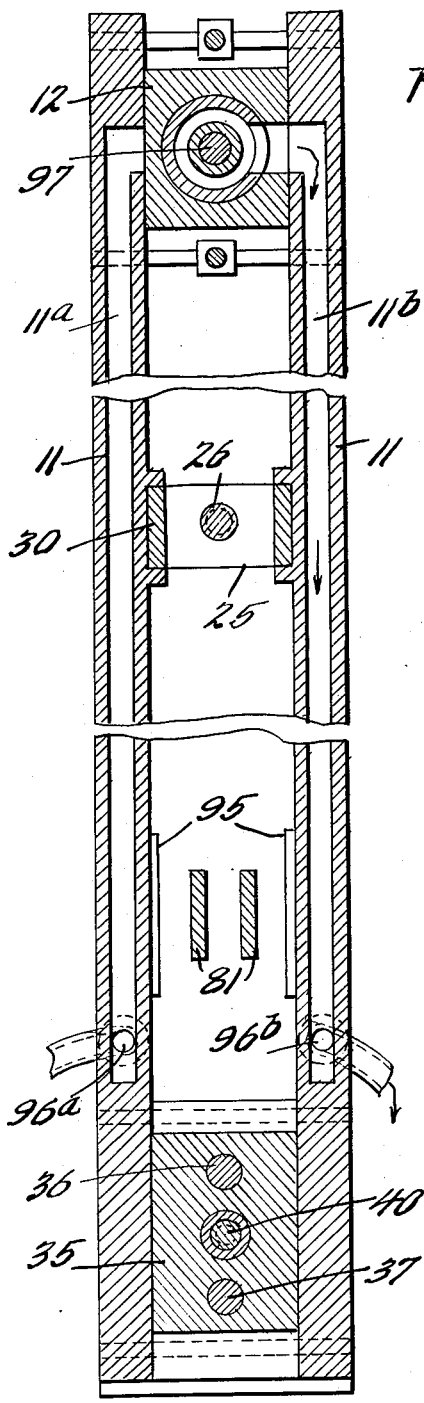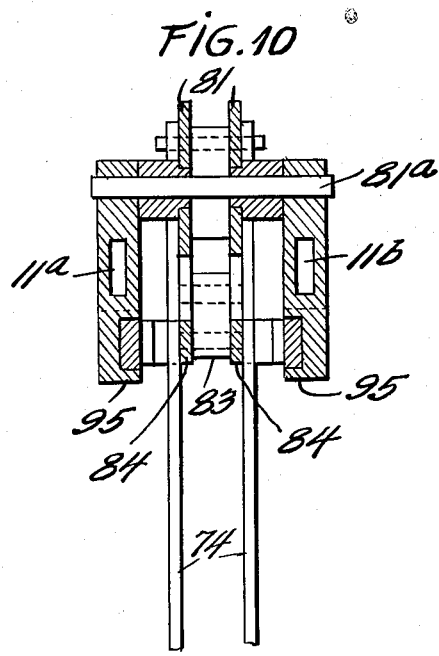

Patented Feb. 5, 1952

2,584,524

UNITED STATES PATENT OFFICE 2,584,524

SINGLE MOLD MACHINE FOR THE MANUFACTURE OF HOLLOW GLASS ARTICLES

Alphons Wyss, Bottmingen, near Basel, Switzerland

Application January 10, 1946, Serial No. 640,217
In Switzerland January 17, 1945

11 Claims. (Cl. 49—5)

In certain types of single mould machines for producing hollow glass articles a parison mould fitted on a carriage describes a rectilinear, to and fro, movement between a gathering place within the glass furnace and a transfer place provided with a finishing mould. On such machines the said carriage slides on guide bars describing a tilting movement at the end of the forward movement of the carriage. Thereby the parison mould is brought into contact with the molten glass body within the glass furnace in order to gather a parison which at the end of the return motion of said carriage will be transferred to the finishing mould in order to be blown.

In another machine of this kind the parison mould fitted on a horizontal carrying bar performs an alternating swinging movement. In this machine the parison mould is brought into contact with the body of molten glass at the end of the swinging motion by imparting through appropriated means to said parison mould a downward movement within a slide-way.

On all the machines of this kind hitherto known a change of moulds of different sizes necessitates a rather tedious and complicated work of adjustment which diminishes the output of the machines. Furthermore the control of the different machine parts requires a certain number of cam discs which are subjected to considerable wear which increases the costs of upkeep.

The present invention relates to a single mould machine for the manufacture of hollow glass ware which avoids the hitherto known disadvantages of machines of this kind. A feature of the invention consists in the provision of a beam carrying a parison or suction mould and which performs an intermittent to and fro swinging motion, which beam may perform a tilting movement at the end of its forward swinging motion in order to obtain an additional dip of the parison mould into the body of glass.

For this purpose the said beam carrying the parison mould is sustained on a parallel motion swinging framework consisting of a double parallelogram, the horizontal upper link of which embodies said beam. In a known manner said beam carrying the parison mould performs a swinging movement between a gathering place within the furnace and a transfer place of the gathered parison to the finishing mould. The sustaining link articulations of the beam on the swinging framework are so arranged as to allow said beam to be adjusted in height in order to be adapted to different parison mould heights without causing an alteration of the longitudinal course of the parison mould. In other words the radial course described by the parison mould remains unchanged by such an adjustment.

A preferred realisation of the machine consists in said beam being sustained in the front of the articulated framework in a single fulcrum, whereas the two sustaining fulcrums of the rear part of said beam are so arranged as to allow a tilting movement of the beam in its forward position around the front fulcrum for a dipping of the parison into the body of glass.

A constructional example of a machine according to the invention is shown on the accompanying drawings in which:

Fig. 4 is an end view of the machine seen towards the front side;

Fig. 4a is, on a larger scale, a section along line IVa—IVa of Fig. 4,

Fig. 4b is, on a larger scale, a vertical section along line IV—IV of Fig. 4,

Fig. 5 is, on a larger scale, a longitudinal section of the front part of the carrying beam of the machine showing its fore-part fulcrum and the parison mould;

Fig. 6 is a fragmentary plan view of the parison mould holder;

Fig. 6a shows, on a larger scale, the front part of Fig. 6, the carrying beam being omitted and the parison mould opened, Fig. 6b shows a portion of Fig. 6a with the neck-mould opened, Fig. 7 is a front view of the rear fulcrums and the mounting of the carrying beam.

Fig. 8 is a section on line VIII—VIII of Fig. 7;

Fig. 9 is a section on line IX—IX of Fig. 5 showing the fore fulcrum and the mounting of the carrying beam.

Fig. 10 is an enlarged sectional view on line X—X of Fig. 5.

Fig. 11 is an enlarged section view on line XI—XI of Fig. 4.

*General arrangement of the horizontal carrying beam*

Figure 1:
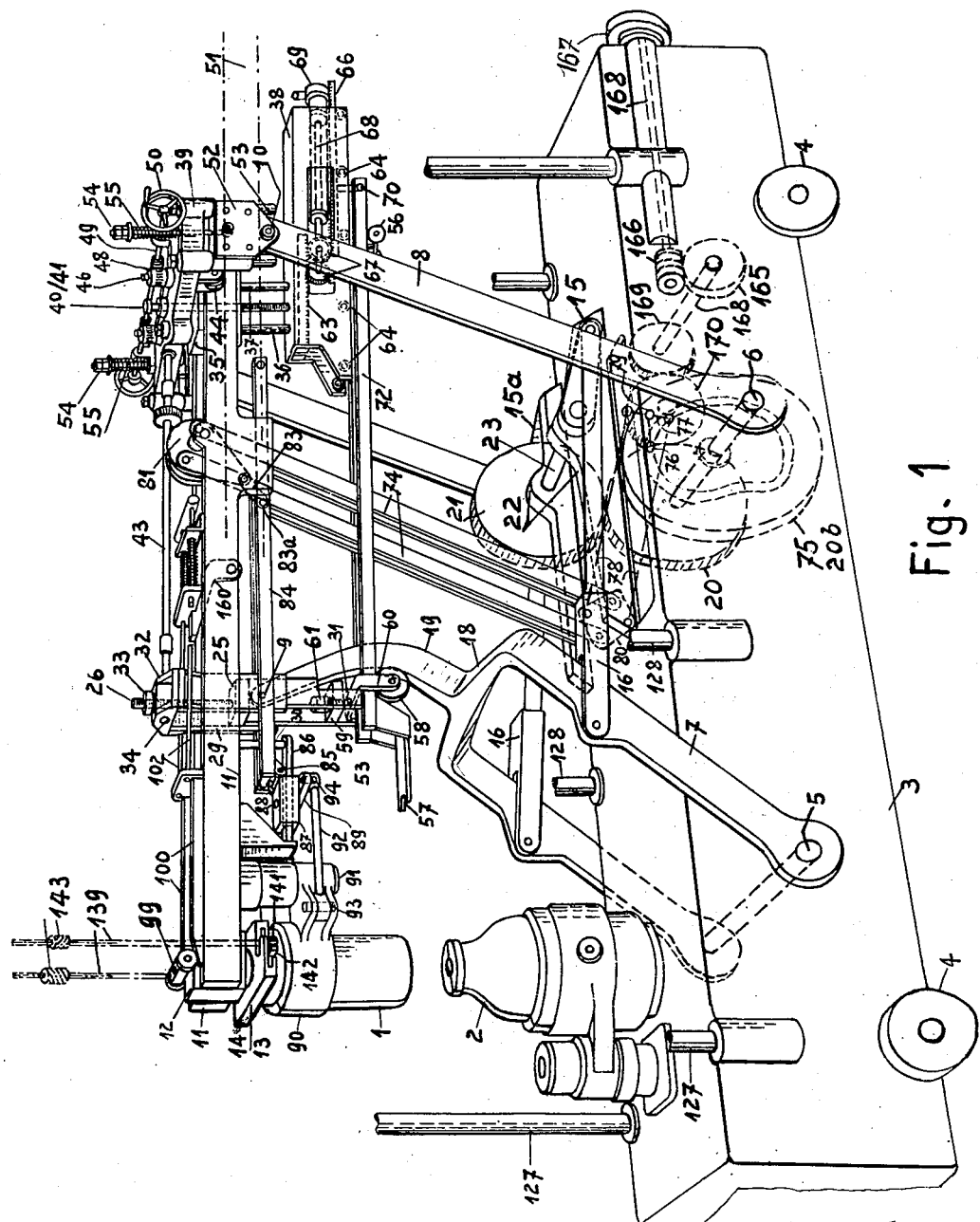
Fig. 1 is a perspective view of the articulated framework sustaining the carrying beam of this single mould machine.
Figure 2:
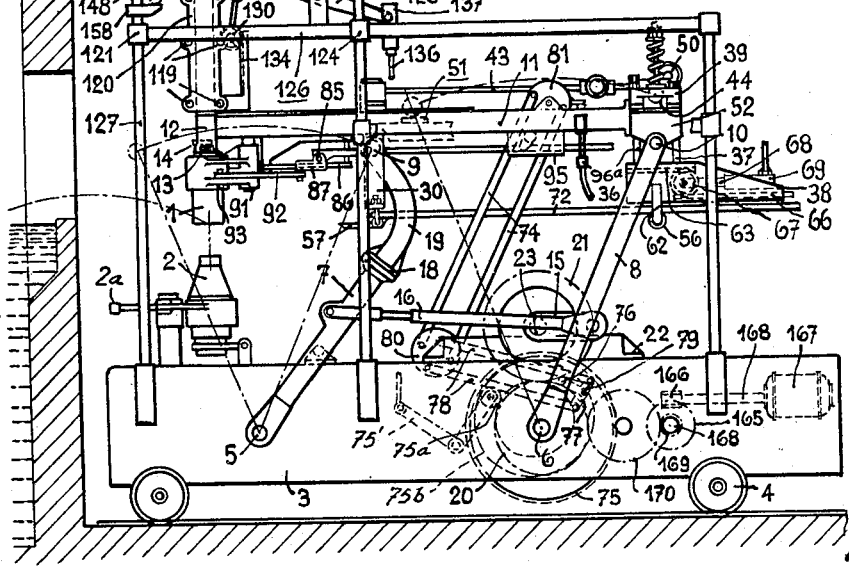
Fig. 2 is an elevation of the machine.

Figs. 1, 2 and 4 illustrate a machine base 3 provided with four wheels 4 and supporting an articulated swinging framework of the kind of a parallelogram motion on which a horizontal carrying beam 11 comprising two longitudinal arms (Figs. 7 and 9) is sustained and adapted to perform a to and fro swinging movement in a vertical plane. This swinging framework includes two shorter frontal swing levers 7 pivoted in bearings 5 of the machine base 3 and two longer rear swing levers 8 pivoted in bearings 6 of the machine base 3. The upper ends of swing levers 7 are connected by a cross piece 18 provided with an upwardly protruding center arm 19, the upper extremity of which includes a pivot 9 belonging to the fore fulcrum of the carrying beam 11. The upper ends of the two longer swing levers 8 on the other hand include pivots 10 belonging to the rear fulcrum of the carrying beam 11.

*Fore fulcrum of the carrying beam*

The fore fulcrum of the carrying beam 11 is particularly shown in Figs. 5 and 9. A pivot 9 provided with ball bearings 27, 28 bears an articulated cross piece or head 25 to which vertical guide arms 30, 31 are fixed, on which arms the carrying beam is guided between guidebars 29. In the cross piece or head 25 a vertical spindle 26 is rotatably mounted, the upper end of which is screw-threaded and engages with a nut bush bearing the worm wheel 33. Worm wheel 33 gears with a worm 34 lodged in a tie 32 connecting the arms constituting the carrying beam 11. The distance between pivot 9 and carrying beam 11, that is, its height above the frame can thus be vertically varied by a rotation of worm wheel 33.

*Rear fulcrum of the carrying beam*

According to Figs. 7 and 8 this fulcrum includes a transverse yoke 39 adjustable in height and supported by the two rear pivots 10.

For this purpose on either end of the yoke 39 two vertically downward extending guide bolts 53 are fixed by means of nuts 53' and collars 53'' (Fig. 7). The lower ends of bolts 53 are slidable in link heads 52 which are articulated on the pivots 10. Upright bolts 54, provided with springs 55, are welded to the link heads 52 and pass freely through openings in yoke 39 between each pair of bolts 53. The coil springs 55 tend to urge the yoke 39 downward. As shown in Fig. 8 two vertical guide pins 36, 37, which extend slidably through vertical guide bores 35' formed in rear end connecting piece 35 of the longitudinal arms of carrying beam 11 are fitted in the median longitudinal plane of the yoke 39. A regulating spindle 40 carrying at its upper end a worm wheel 41 is screwed into a nut sleeve fitted into said connecting piece 35. Worm wheel 41 gears with a worm 171 fitted on a longitudinal regulating shaft 43 (Figs. 5 and 7), the front end of which bears another worm 34 the purpose of which is to turn the regulating spindle 26. It follows that by rotating the regulating shaft 43 the carrying beam 11 is simultaneously lifted or lowered vertically at both ends. A casing 38 including several parts, which will be mentioned hereafter, is mounted at the lower end of the guide pins 36, 37.

*Driving gear for the reciprocating swinging movement of the carrying beam*

The articulated frame-work is actuated by a double crank 15, 15a (Figs. 2 and 4) rotated in a clockwise direction by an electrical motor 167, cased in the machine frame 3, over a driving gear diagrammatically shown on the drawing, whose transmitting connecting rods 16 are linked to the front swing levers 7 and to said double crank. The above mentioned driving gear includes two wheels 20, 20b, loosely mounted on a common shaft 6, which serves at the same time as an articulation of the two rear swing levers 8. The wheel 20 meshes with a wheel 21 fitted with a crank 15a mounted on a shaft 23 rotatably mounted in two longitudinal girders 22. The driving motor 167 is provided with an extended shaft 168 the extremity of which carries a worm 166 meshing with a worm wheel 165. The shaft 168 carries a clutch permitting an alternating rotation of wheels 20, 20b gearing with the intermediate wheels 170 and pinions 169.

A cam disc 75 is connected to the loose wheel 20b on shaft 6 (Fig. 4) and from here by means cooperating with the rods 2a the mould halves of the finishing mould 2 (Fig. 2) are opened and closed independently from the swinging movement of the carrying beam as is more fully disclosed in my copending application Ser. No. 640,218, which issued as Patent No. 2,438,088, March 16, 1948.

Through a parison mould 1 disposed together with a suction head 12 at the fore end of carrying beam 11 parisons are transferred to said finishing mould in order to be shaped into bottles or other hollow glass articles. The suction head 12 is locked between the fore extremities of the arms of carrying beam 11 and is actuated pneumatically by vacuum and compressed air. The arms of carrying beam 11 are hollow and the right hand arm (Fig. 7) serves as a vacuum duct 11a and the other as a duct 11b for compressed air. The longitudinal ducts of the arms of carrying beam 11 are connected by means of flexible tubes 96a and 96b to sources of vacuum and compressed air respectively.

*Additional tilt of the carrying beam for dipping the parison mould into the body of glass in the furnace*

Figure 3:
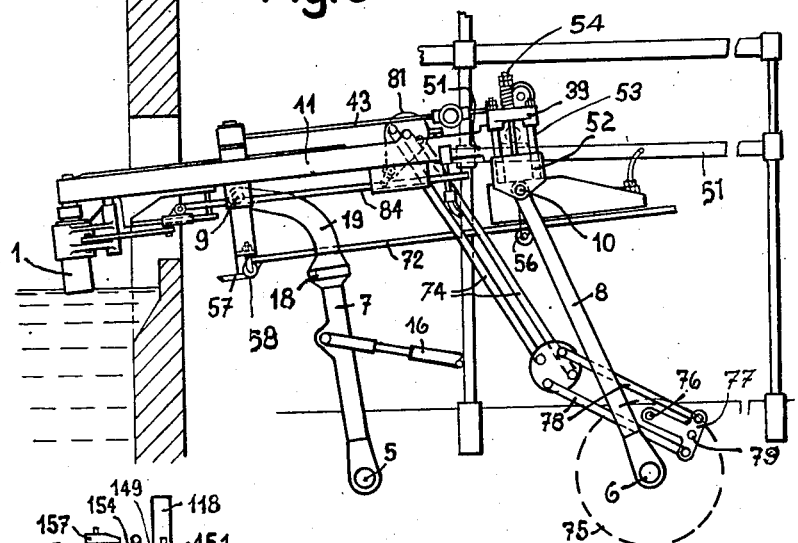
Fig. 3 shows in a similar manner as in Fig. 2 a partial view of the machine parts in the foreward position.

Parting from its initial position (Fig. 1) the orifice of the parison mould 1 describes a forewardly directed arc motion the constant length of which is determined by the angle of oscillation of the articulated framework driven by the crank gearing. As the glass level in the furnace is of varying height it is necessary to adapt the orifice of suction mould 1 to this eventuality and the suction mould is therefore, if necessary, dipped additionally at the end of the foreward swinging motion. For that purpose the carrying beam 11 is lifted at its rear end and so tilted around the frontal pivot 9. This tilting position is shown in Fig. 3. The tilting of the carrying beam is obtained as follows:

As shown in Fig. 7 yoke 39 carries two vertical spindles 46 the lower end of which is fork shaped. These forks gliding in guides 47 are fitted with rollers 44. Lodged in the yoke 39 are worm wheels 48 provided with internal threads into which the spindles 46 are screwed. The worm wheels 48 mesh with worms arranged on a common shaft 49 provided on both ends with hand wheels 50 and rotatably mounted on the yoke 29.

The rollers 44 are raised or lowered according to the sense of rotation of regulating shaft 49. At the end of the foreward swinging movement of the carrying beam these rollers 44 when sufficiently lowered ascend fixed tracks 51 (Figs. 2 and 3) thereby lifting the carrying beam against the compressing effect of the springs 55 and tilting it around pivot 9. The rollers 44 are raised or lowered during the operation of the machine so as to always assure a correct dip of the parison mould in the body of glass.

*Arrangement of the knife for severing the glass from the orifice of the parison mould*

The arrangement of the knife 57 and of the parts of its operating mechanism is shown in Figs. 2, 3, 5, 8 and 9.

Knife 57 is fitted to the fore end of longitudinal sliding bars 72 supported by a pair of front rollers 58 and a pair of rear rollers 56. The pair of front rollers 58 is mounted in a support 60 (Figs. 5 and 9) suspended on a regulating screw 61 mounted within a cross tie 59 connecting the lower ends of the two guide bars 30, 31 thus permitting a vertical adjustment of the knife during operation. The pair of rear rollers 56 on the other hand is mounted in brackets 62 (Fig. 2) fastened on the casing 38. The knife 57 is operated by a multiplying rack gear located within casing 38, the upper rack 63 (Figs. 2 and 8) being fixed on the casing 38 and the lower longitudinally moving rack 66 gliding along guide rollers 64 mounted in casing 38. A pinion 67 meshes with both racks and is disposed at the end of a rod 68 gliding in a compressed-air cylinder 69 provided in casing 38. A fork 71 embracing a knob 70 of the longitudinal bars 72 is fitted on the moving rack 66. After the gathering of glass by suction mould 1 air pressure is applied to the compressed air cylinder 69 thus inflicting a rapid forward movement and a later withdrawal of the meshing pinion 67. The movable rack 66 thus performs double the foreward motion of pinion 67 and carries foreward also gliding bars 72 and the string of glass adhering to the suction mould 1 is severed in the known manner by the knife 57.

*Opening and closing of the parison mould*

As usual the parison mould 1 consists of two mould halves supported by carrying arms 90 pivoting on a hinge pin 91 (Figs. 5, 6 and 6a). During the transfer of the gathered parison to the finishing mould 2 both carrying arms 90 are spread and afterwards closed as usual; the appropriate mechanism shown in Figs. 2, 3, 5, 6 and 6a is operated by a track of the cam disc 75. The mechanism comprises two pairs of link motion levers 74 and 78 coupled together by a link disk 80 (Fig. 2) and articulated on both ends with parts 77 and 81 respectively. Part 77 is a T-shaped lever swingably mounted about a stationary pivot 79, the vertically extending arm being provided with a cam roller 76 meshing with a track of cam disc 75. Part 81 mounted on pin 81a (Fig. 5) is a swing lever connected by a link 83 and a trunnion 83a to a pair of connecting bars 84 sliding on this side in guides 95. Lever 81 is pivoted in a fixed pin 81a, Fig. 5. The connecting bars 84 extending foreward are articulated at the opposite end by means of a pin 85 on a slide 87 moving on a slide bar 86. This slide 87 carries a pivot 88 to which a swing-bar 89 is linked. As indicated in Fig. 6 and shown in Fig. 6a both ends of swing-bar 89 are provided with pins 94 articulating with rods 92 linked to the halves of a mould holder 90 by means of pins 93. A counterclockwise swing motion of swing lever 81 transmitted by the cam disc 75 through the disc jointed crank motion 78 causes a backward movement of the connecting bars 84 and therefore a wide spread of the mould holders 90 and an opening of the suction mould halves as shown in Fig. 6a.

A motion of swing lever 81 in the opposite direction causes the closing of the suction mould.

*Raising and lowering of the plug associated to the neck mould*

Plug 97 (Fig. 5) is held in a locking bar 99 provided with rollers on either side is raised after the gathering operation by a foreward movement of a pair of bevel edged sliding bars 100, connected to a pair of connecting rods 102. Fig. 5 shows only one of the sliding bars 100 and one connecting rod 102. The longitudinal movement of the sliding bars 100 effecting the up and down course of the plug 97 is performed as follows:

Simultaneously the slotted bent lever 162 turning by its own weight engages with latch bar 162a thus retaining the system in the rear position under the action of the now compressed spring 160. (Bottom view of Fig. 5.) Towards the end of the backward swinging motion of beam 11 a slight drawback of rod 163 disengages slot lever 162 and latch 162a. Under the pushing action of the compressed spring 160, rod 102 and bars 100 are moving forward thus raising plug 97. The backward release slot of rod 163 is not shown in Fig. 5. The sloped sliding bars 100 push against rollers of the cross bar 99, Figs. 1 and 5. Under the impulse of compressed springs 160 the sliding bars 100 and rods 102 are pushed forward thereby lifting cross bar 99 to which the plug 97 is attached.

The rearward movement of the sliding bars 100 and rods 102, and the lowering of cross piece 99 with plug 97, is performed by drawing back the tie rod 161. The drawing back of tie rod 161 is performed by a rearward movement of the fixed tracks 51, Fig. 1 and 2 bearing an adjustable slot.

The drawing back of the sliding bars 100 and rods 102 compresses springs 160 and the device is retained by latch bar 162a pushing against slot lever 162.

*Neck-mould mechanism*

The neck mold 13 carried in a frame 14 (Figs. 2, 4, 5, 6a and 6b) is associated with the suction mold 1. The laterally extending flaps 14a of frame 14 are supported by the protruding lugs 117 of a pair of vertical sliding bars 118 as soon as the suction mould 1 opens (Fig. 6b). At the end of the backward swinging movement of beam 11 the flaps 14a of frame 14 comprising the neck mold holder 13 resting on suction mold 1 (Fig. 5), rest on the protruding lugs 117 of the vertical gliding bars 118. The latter are guided between rollers 119 fitted in lateral guide ways 120. These guide ways 120 are carried on upper and lower longitudinal bars 125, 126, which together with cross rods 122, 121, 123, 124 and the upper parts of posts 127 and 128 fixed to the machine frame Figs. 2 and 4 form a rigid frame. The upper parts of sliding bars 118 are connected by a yoke 129 (Fig. 4) its center being screwed into a regulating spindle 133 rotatably mounted in a crosshead 132 disposed between the sliding bars 118. Crosshead 132 is associated with a rack- and -pinion motion causing its vertical displacement. For this purpose a pair of racks 131 (Fig. 2) is fitted on the crosshead 132 whereas another pair of racks 134 meshing with a pair of pinions 130 is fixed on both guide-ways 120 (Fig. 4a). A height regulation of the suction mould carrying beam 11 as previously mentioned, necessitates obviously a corresponding height regulation of the neck mould frame 14 which is obtained by turning the regulating spindle 133. As cross-head 132 is held in its position by the pair of pinions 130, a turning of the regulating spindle 133 in one or the other direction brings up or down yoke 129 together with the connecting slide bars 118 and the neck mould holder 14 suspended on the lugs 117 of said bars. In this manner the neck mould holder frame 14 is adapted to any new level of suction mould 1 fitted to beam 11.

The downward and upward movement of neck mould holder frame 14 for the transfer of a parison to the finishing mould 2 is performed by a track 75b of cam disc 75, a bell-crank lever 75' and roller 75a (Fig. 2). In order to effect a downward movement of neck mould frame 14 a partially shown connecting rod 136 linked to a double lever 138 by a linkhead 137 (Fig. 2) and actuated by the aforementioned means is pushed upwards so transmitting a downward movement to the elastic connecting rods 135 with pinions 130. The latter engage the fixed rack 134 and the mobile rack 131 fixed on the cross head 132 which so is moved over twice the way of pinions 130. Together with cross head 132 and through the intermediary of the yoke 129, the regulating screw 133 and the sliding bars 118, the neck-mould frame 14 reposing as above described on the lugs 117 of the bars 118 is also lowered. For performing the actual transfer of the parison to the finishing mould the neck mould 13 is immediately opened (Fig. 6b) after arriving above the finishing mould 2 at the end of the downward course of the frame 14 whereupon the pair of pinions 130 returns to its initial position and sliding bars 118 with neck mould 13 return likewise to the suction head 12 held between the suction mould carrying beam 11.

*Opening and closing of the neck mould for the transfer of a parison to the finishing mould*

In order to simplify the mechanism this movement is combined with the upward and downward course of the neck mould as just described. According to Figs. 4 and 4a a pair of vertical shafts 139 sustained in yoke 129 is disposed on either inner side of the sliding bars 118. The lower ends of these two vertical shafts are rotably mounted in bearings 140, the upper ends being supported in thrust bearings 170 arranged on the top of the yoke 129. Pinions 141 engaging with toothed segments 142 protruding from either side of the neck-mould halves are fitted on both lower ends of the shafts 139 (Figs. 6, 6a and 6b).

Each time at the end of the backward motion of carrying beam 11 these segments 142 engage the pinions 141.

The partly splined vertical shafts 139 extending through the cross head 132 traverse screw gear pinions 143 meshing with horizontal screw gear pinions 144 fitted on pins 145 (Figs. 4, 4a). Symmetrically disposed levers 146 on pins 145 are linked to a cross head 148 of a vertically gliding shaft 149 by links 147. The vertically gliding shaft 149 moves in a bore 150 of cross head 132 and is maintained in position by a compressed helical spring 151. (Figs. 2, 4b.)

For the reasons of simplification this movement is combined with the upward and downward course of the parted neck mold 13 as just described. According to Figs. 2, 4 and 4a a pair of vertical shafts 139 sustained in yoke 129 is disposed on either inner side of the vertical gliding bars 118. The lower ends of these two shafts 139 are rotatably mounted in bearings 140, (Fig. 2) the upper ends being supported in thrust-bearings 170 arranged on the top of the yoke 129. Pinions 141 meshing with racks 142 protruding from either side of the neck mold halves 13 are fitted on both lower ends of the shafts 139 (Figs. 6, 6a and 6b).

Each time at the end of the backward motion of carrying beam 11 these racks 142 mesh with the pinions 141.

The partly splined vertical shafts 139 passing through the cross head 132 traverse screw gear pinions 143 meshing with screw gear pinions 144 fitted on a pair of pins 145 (Figs. 4, 4a). Symmetrically disposed levers 146 on pins 145 are linked to a cross head 148 of a vertically gliding shaft 149 by links 147 (Figs. 4b, 4). The vertically gliding shaft 149 moves in a bore 150 of cross head 132 and is maintained in position by a compressed helical spring 151 (Figs. 2, 4b). Linked to cross head 148 is a lever 152 which together with lever 154 articulated in a pin 153 forms a toggle joint. Every time at the end of the downward movement of neck mold frame 14 stop 158 adjustable on post 127 (Fig. 2) starts the spreading of the neck mold halves 13 by means of the just described device released by the compressed helical spring 151. (Figs. 6b and 4b with toggle joint in chain-dotted lines.) Thus the parison hitherto held in the closed neck mold 13 is discharged to the finishing mold 2. At the end of the following upward movement of mold frame 14 on vertical bars 118 roller 159 bears against the stop 157 fixed on stud 156 (Fig. 2) thus straightening toggle joint 154, 153, 152 (Fig. 4b). The thus reversed movement of vertical shaft 149 results in the closing movement of the neck mold halves 13 (Fig. 6a) which remain now tightly closed by the lower pinions 141 of splined shafts 139 and racks 142 fixed on both halves of neck-mold 13.

Opening and closing of the finishing mould as well as the blowing of the bottles in the finishing mould and the subsequent discharge are realised by means already known and are therefore not shown.

Compared with known machines of the same kind the principal advantages of the above described machine are as follows:

(1) The hitherto known considerable adjusting labor required by a change of moulds is avoided, the swinging horizontal beam with the parison mould can readily be adjusted to any different level to correspond to the finishing mould by actuating the hand wheel of a single spindle.

(2) The adaptation of the neck mould to the varying heights of the parison mould is also performed by means of a single spindle and hand wheel. For this purpose it is only necessary to bring the neck mould holder again into contact with the previously adjusted suction head on the carrying beam by a turn of this spindle, whereupon the operation of the machine may be resumed. This adjustment is done without touching any other mechanism.

It follows that the height adjustment of the suction organs together with the previously mentioned adjustment of the suction mould is reduced to a minimum, thus the operation of the machine may continue without any prolonged interruption.

(3) The above mentioned carrying beam of the parison mould being sustained on an articulated framework describing a foreward and backward swing motion between a gathering place and a transfer place, any hitherto known carrying slides of the parison mould are avoided.

(4) In contradistinction to the known machines of this type operations necessitated by the foreward and backward motion of the parison mould are carried out without employing any cam disc, therefore the construction of the machine is simplified and the costs of upkeep reduced.

(5) At the end of the foreward swinging motion of the parison mould to the gathering place, to the parison mould an additional dipping movement may be imparted if necessary, the extent of which is adapted to the varying glass level during the operation by a regulating hand wheel.

(6) The knife, the purpose of which is to sever the string of glass adhering to the parison mould after the gathering, remains at a fixed level unaltered by any change of the parison mould. Its initial position behind the parison mould permits a change without any loss of time and the heat influence from the furnace is of no importance there.

(7) Both longitudinal girders composing the carrying beam of the parison mould are hollow and serve as vacuum and compressed air ducts ending at the suction head. The fore end of both longitudinal girders being arranged as a champing jaw embracing the suction head, the latter may easily be exchanged.

(8) The opening of the neck mould is automatically performed by a recoiling gear motion at the end of the downward course when transferring the parison to the finishing mould, the same gear being automatically closed at the end of the upward motion so that the hitherto known cam track motion is avoided.

(9) In contradistinction to known machines of this type no change or alteration of the opening and closing mechanism of the parison mould and the neck mould occurs when a change of any different mould takes place on this machine.

I claim:

1. In an automatic single mould machine for the manufacture of hollow glass articles, in combination, a carrying beam, an articulated swing lever framework on which said carrying beam is mounted, a finishing mould, a parison mould interchangeably fitted to said carrying beam and adapted by said frame-work to carry out a reciprocating swinging movement over the same length of the curved path between a gathering place in a furnace and a transfer place in which the finishing mould is situated irrespective of the height of the parison mould, an articulated connection between said carrying beam and said framework including one pivot for the front part of said beam and two pivots for the rear part thereof, vertically disposed guide means, carried by said front pivot, vertically disposed guide means carried by said rear pivots, said carrying beam having front and rear guide means engaging the vertically disposed guide means carried by said front and rear pivots, respectively, means for adjusting the height of said carrying beam vertically relatively to said pivots, during which adjustment said guide means are effective to ensure that the movement of the beam is vertical, and means adapted to tilt the carrying-beam about its front pivot, said tilting means including fixed tracks, vertically adjustable rollers provided on said rear adjustable member and cooperating with said tracks for effecting a lifting of the rear part of said beam and thereby said tilting movement when the parison-mould is in its foremost position to cause the latter to be dipped into the body of glass in the furnace.

2. In an automatic single mould machine for the manufacture of hollow glass articles, in combination, a carrying beam, an articulated swing lever framework on which said carrying beam is mounted, a finishing mould, a parison mould interchangeably fitted to said carrying beam and adapted by said framework to carry out a reciprocating swinging movement over the same length of the curved path between a gathering place in a furnace and a transfer place in which the finishing mould is situated irrespective of the height of the parison mould, an articulated connection between the front part of said carrying beam and said frame work including a cross-head articulated to said frame work, vertical guides for said beam provided on said cross-head, a screw-threaded spindle carried by said cross-head, a nut cooperating with said spindle and mounted on said carrying beam, and a worm gear for actuating said nut and for adjusting thereby the height of said carrying beam relative to said frame work, an articulated connection including two pivots between the rear part of said beam and said frame work and including a yoke fixed in vertical position relative to said two pivots, a screw threaded spindle mounted in the mid-portion of said yoke and suspending said carrying beam from the yoke, a worm wheel fitted to said spindle, a worm cooperating with said worm wheel, whereby an actuation of said worm and of the worm gear of the connection of the front part of the carrying beam causes an adjustment of the height of said beam relative to said frame work.

3. In an automatic single mould machine for the manufacture of hollow glass articles, in combination, a carrying beam, an articulated swing lever framework on which said carrying beam is mounted, a finishing mould, a parison mould interchangeably fitted to said carrying beam and adapted by said framework to carry out a reciprocating swinging movement over the same length of the curved path between a gathering place in a furnace and a transfer place in which the finishing mould is situated irrespective of the height of the parison mould, an articulated connection between said carrying beam and said frame work including one pivot for the front part of said beam and two pivots for the rear part thereof, the articulated connection between the front part of said carrying beam and said frame work including a cross-head articulated to said frame, vertical guides for said beam provided on said cross-head, a screw-threaded spindle carried by said cross-head, a nut cooperating with said spindle and mounted on said carrying beam, and a worm gear for actuating said nut, the articulated connection at the rear part including a yoke adapted to be vertically displaced relatively to said two pivots, a screw threaded spindle mounted in the mid-portion of said yoke, and means to suspend said carrying beam from said spindle, a worm wheel fitted to said spindle, a worm cooperating with said worm wheel, a driving shaft common to said worms, so that an actuation of said driving shaft causes a simultaneous lifting or lowering of the front and rear part of said carrying beam.

4. In an automatic single mould machine for the manufacture of hollow glass articles, in combination, a carrying beam, an articulated swing lever framework on which said carrying beam is mounted, a finishing mould, a parison mould interchangeably fitted to said carrying beam and adapted by said framework to carry out a reciprocating swinging movement over the same length of the curved path between a gathering place in a furnace and a transfer place in which the finishing mould is situated irrespective of the height of the parison mould, an articulated connection between said carrying beam and said framework including one pivot for the front part of said beam and two pivots for the rear part thereof, the articulated connection between the front part of said carrying beam and said framework including a cross-head articulated to said frame, vertical guides for said beam provided on said cross-head, a screw-threaded spindle carried by said cross-head, a nut cooperating with said spindle and mounted on said carrying beam, and a worm gear for actuating said nut the articulated connection at the rear part including a yoke adapted to be vertically displaced relatively to said two pivots, a screw threaded spindle mounted in the mid-portion of said yoke, and means to suspend said carrying beam from said spindle, a worm wheel fitted to said spindle, a worm cooperating with said worm wheel, rollers adjustably mounted in the vertical direction in said yoke, worm wheel gearings for adjusting the height of said rollers relative to said yoke, spring means adapted to press the yoke towards said rear pivots, and a fixed track on which said rollers run during the end of the forward movement of said carrying beam for causing a tilting of the latter about its front pivot against the action of said spring means to allow the parison mould to be dipped into the body of glass in the furnace.

5. In an automatic single mould machine for the manufacture of hollow glass articles, in combination, a carrying beam, an articulated swing lever framework on which said carrying beam is mounted, a finishing mould, a parison mould interchangeably fitted to said carrying beam and adapted by said framework to carry out a reciprocating swinging movement over the same length of the curved path between a gathering place in a furnace and a transfer place in which the finishing mould is situated irrespective of the height of the parison mould, pivots interposed between said carrying beam and said framework and means adapted to adjust the height of said carrying beam relative to said pivots, a knife for severing the glass from the orifice of the parison mould, a pair of knife supporting bars, front rollers and rear rollers for supporting said bars, means adapted to adjust said front rollers in height, which means include a regulating screw, and means to impart an endwise to and fro movement to said knife supporting bars.

6. In an automatic single mould machine for the manufacture of hollow glass articles, in combination, a carrying beam, an articulated swing lever framework on which said carrying beam is mounted, a finishing mould, a parison mould interchangeably fitted to said carrying beam and adapted by said framework to carry out a reciprocating swinging movement over the same length of the curved path between a gathering place in a furnace and a transfer place in which the finishing mould is situated irrespective of the height of the parison mould, pivots interposed between said carrying beam and said framework and means adapted to adjust the height of said carrying beam relative to said pivots, a knife for severing the glass from the orifice of the parison mould, a pair of knife supporting bars, front rollers and rear rollers for supporting said bars, means adapted to adjust said front rollers in height, which means include a regulating screw, an upper fixed toothed rack, a longitudinally movable lower rack, a connection between said lower rack and said knife supporting bars, a pinion interposed between and in mesh with both of said racks, and means to impart a longitudinal to and fro movement to said pinion whereby said knife supporting bars perform twice the course of said pinion.

7. In an automatic single mould machine for the manufacture of hollow glass articles, in combination, a carrying beam, an articulated swing lever framework on which said carrying beam is mounted and comprising a pair of upstanding front levers and a pair of upstanding rear levers and pivot connections at both ends of said levers to articulate said carrying beam to the one ends of said levers and to turnably mount said levers in a base, a double crank, connecting rods interposed between said double crank and said front levers for imparting the swinging motion to said frame-work and carrying beam, gear wheels for driving said double crank, a finishing mould, a parison mould interchangeably fitted to said carrying beam and adapted by said framework to carry out a reciprocating swinging movement between a gathering place in a furnace and a transfer place in which the finishing mould is situated, and means for adjusting the height of said carrying beam relative to said pivot connections.

8. In an automatic single mould machine for the manufacture of hollow glass articles, in combination, a carrying beam, an articulated swing lever framework on which said carrying beam is mounted, a finishing mould, a parison mould interchangeably fitted to said carrying beam and adapted by said framework to carry out a reciprocating swinging movement between a gathering place in a furnace and a transfer place in which the finishing mould is situated, a neck mould, a frame holding said neck mould, a suspending mechanism for said neck mould frame permitting a vertical movement of said neck mould frame for transferring the parison from said parison mould to said finishing mould, which mechanism includes a vertical slide composed of two gliding bars, a connecting yoke, and vertical guide means for guiding said bars, a cross head, and a screwed spindle rotatably mounted in said cross head and screwed into said yoke for adjusting in height said slide.

9. In an automatic single mould machine for the manufacture of hollow glass articles, in combination, a carrying beam, an articulated swing lever framework on which said carrying beam is mounted, a finishing mould, a parison mould interchangeably fitted to said carrying beam and adapted by said framework to carry out a reciprocating swinging movement between a gathering place in a furnace and a transfer place in which the finishing mould is situated, a neck mould comprising two halves, a frame holding said neck mould and consisting of two halves, a suspending mechanism for said neck mould frame permitting a vertical movement of said neck mould frame for transferring the parison from said parison mould to said finishing mould, which mechanism includes a vertical slide composed of two gliding bars, a connecting yoke, and vertical guide means for guiding said bars, a cross head, and means adapted to open said neck mould halves automatically at the end of the downward course of said slide, which means include a spring compressed toggle lever connected to said cross-head, a stop for actuating said toggle lever, screw gear pinions and horizontal pins mounted on said cross head and on which said pinions are fixed, further screw thread pinions meshing with the aforementioned pinions and vertical shafts on which said further pinions are mounted, spur pinions fixed to the lower ends of said shafts, and racks fixed to said neck holder frame halves and meshing with said spur pinions for opening and closing said neck mould halves.

10. In an automatic single mould machine for the manufacture of hollow glass articles, in combination, a carrying beam, an articulated swing lever framework on which said carrying beam is mounted, a finishing mould, a parison mould, a neck mould comprising two halves, a frame holding said neck mould and consisting of two halves, a holder for said parison mould and carried by said carrying beam, means adapted to open and close said parison mould holder irrespective of the height adjustment of said carrying beam which means include a cam disc having a track, a roller cooperating with said track, a swingably mounted T-shaped lever on which said roller is mounted, and disc jointed transmitting rods operatively connected to said mould holder halves and connected to said T-shaped lever, said parison mould being adapted by said framework to carry out a reciprocating swinging movement between a gathering place in a furnace and a transfer place in which the finishing mould is situated, and means for adjusting the height of said carrying beam relative to said framework.

11. In an automatic single mould machine for the manufacture of hollow glass articles, in combination, a carrying beam, an articulated swing lever framework on which said carrying beam is mounted, said framework including front and rear swingable arms, said carrying beam having front and rear fulcrums, a finishing mould, a parison mould interchangeably fitted to said carrying beam and adapted by said framework to carry out a reciprocating swinging movement between a gathering place in a furnace and a transfer place in which the finishing mould is situated, said fulcrums having pivots to which the upper ends of said swingable arms are connected, respectively, vertically disposed guide means carried by said front and rear pivots, respectively, front and rear guide means mounted on said carrying beam interengaging, respectively, the guide means carried by said front and rear pivots, means for adjusting the height of said carrying beam relative to the pivots, during which adjustment the interengaging guide means ensure that the adjustment is vertical, so that in operation the orifices of parison moulds of different height always move over the same length of the curved path between the finishing mould and the gathering place.

ALPHONS WYSS.

REFERENCES CITED

The following references are of record in the file of this patent:

UNITED STATES PATENTS

| Number | Name | Date |
|---|---|---|
| 350,027 | Wang | Sept. 28, 1886 |
| 586,563 | Parsons | July 20, 1897 |
| 792,581 | Bock | June 20, 1905 |
| 1,156,009 | Kadow | Oct. 5, 1915 |
| 1,338,604 | Wilzin | Apr. 27, 1920 |
| 1,439,368 | LaFrance | Dec. 19, 1922 |
| 1,499,526 | Hall | July 1, 1924 |
| 1,891,552 | McCrosky | Dec. 20, 1932 |
| 1,898,404 | Soubier | Feb. 21, 1933 |
| 2,175,064 | O'Neill | Oct. 3, 1939 |
| 2,365,929 | Allen et al. | Dec. 26, 1944 |

FOREIGN PATENTS

| Number | Country | Date |
|---|---|---|
| 216,164 | Great Britain | Jan. 22, 1925 |
| 259,601 | Great Britain | Jan. 9, 1928 |